United States Patent
Taguchi et al.

(10) Patent No.: US 12,547,508 B2
(45) Date of Patent: Feb. 10, 2026

(54) DISTRIBUTED CONSENSUS METHOD, DISTRIBUTED SYSTEM AND DISTRIBUTED CONSENSUS PROGRAM

(71) Applicant: Hitachi, Ltd., Tokyo (JP)

(72) Inventors: Yuta Taguchi, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/689,541

(22) Filed: Mar. 8, 2022

(65) Prior Publication Data

US 2022/0327033 A1 Oct. 13, 2022

(30) Foreign Application Priority Data

Apr. 7, 2021 (JP) ................................ 2021-065468

(51) Int. Cl.
*G06F 11/00* (2006.01)
*G06F 11/18* (2006.01)

(52) U.S. Cl.
CPC ........ *G06F 11/182* (2013.01); *G06F 2201/85* (2013.01)

(58) Field of Classification Search
CPC .... G06F 11/182; G06F 2201/85; G06F 17/16; G06F 18/22

See application file for complete search history.

(56) References Cited

U.S. PATENT DOCUMENTS

| | | | |
|---|---|---|---|
| 7,756,830 B1* | 7/2010 | Chao ..................... | G06F 11/182 707/638 |
| 8,255,100 B2* | 8/2012 | Schimert ............ | G05B 23/0254 702/183 |
| 9,172,670 B1* | 10/2015 | Gupta ................. | G06F 11/0793 |
| 11,269,679 B2* | 3/2022 | Raman ................ | G06F 11/1474 |
| 11,636,368 B2* | 4/2023 | Ye ........................ | G06V 40/174 706/12 |
| 11,722,589 B2* | 8/2023 | Tong ...................... | H04W 4/40 707/703 |
| 12,008,557 B2* | 6/2024 | Condron ............ | G06Q 20/3829 |

(Continued)

FOREIGN PATENT DOCUMENTS

WO 2015/186191 A1 12/2015

*Primary Examiner* — Loan L.T. Truong
(74) *Attorney, Agent, or Firm* — Procopio, Cory, Hargreaves & Savitch LLP

(57) ABSTRACT

A distributed consensus method for performing data consensus processing in a distributed system that couples one or more client apparatuses and a plurality of server apparatuses via a network, the method including a step in which each server apparatus performs data operation according to a predetermined distributed consensus algorithm, a step in which an auxiliary consensus device, which is an auxiliary device that assists in reaching a consensus in the event of a failure in response to a request from each server apparatus, decides an auxiliary consensus decided value, and a step in which the auxiliary consensus decided value is caused to take precedence over the decided value of the distributed consensus algorithm under conditions under which the auxiliary consensus decided value decided by the auxiliary consensus device and the decided value decided by the distributed consensus algorithm can conflict with each other.

7 Claims, 14 Drawing Sheets

(56) References Cited

U.S. PATENT DOCUMENTS

| | | | | |
|---|---|---|---|---|
| 2004/0014044 | A1* | 1/2004 | Scott | G16B 25/00 |
| | | | | 702/20 |
| 2009/0216393 | A1* | 8/2009 | Schimert | G05B 23/0254 |
| | | | | 701/14 |
| 2009/0276654 | A1* | 11/2009 | Butterworth | G06F 11/182 |
| | | | | 714/1 |
| 2013/0282789 | A1* | 10/2013 | Langworthy | H04L 67/02 |
| | | | | 709/203 |
| 2014/0096061 | A1* | 4/2014 | Olson | G06Q 10/06 |
| | | | | 715/772 |
| 2017/0011086 | A1* | 1/2017 | Fukunaka | G06F 16/2365 |
| 2019/0179534 | A1* | 6/2019 | Feytons | H04L 69/324 |
| 2019/0340011 | A1* | 11/2019 | Raman | G06F 9/466 |
| 2020/0233761 | A1* | 7/2020 | Sugisawa | G06F 11/187 |
| 2020/0259658 | A1* | 8/2020 | Libsch | G06F 21/72 |
| 2021/0263809 | A1* | 8/2021 | Zhang | G06F 11/1469 |
| 2021/0349858 | A1* | 11/2021 | Jaltade | G06F 16/14 |
| 2022/0383304 | A1* | 12/2022 | Camenisch | G06Q 20/223 |
| 2022/0388505 | A1* | 12/2022 | Sharma Banjade | G08G 1/005 |

\* cited by examiner

FIG. 7

| RECEIVED DATA | PROPOSAL NUMBER OF RECEIVED DATA | WHEN AUXILIARY CONSENSUS DECIDED VALUE IS HELD | WHEN NORMAL DECIDED VALUE IS HELD |
|---|---|---|---|
| NORMAL DECIDED VALUE | LARGER THAN DATA HELD | REJECTED | ACQUIRE AND / OR STORE |
| NORMAL DECIDED VALUE | SMALLER THAN DATA HELD | REJECTED | REJECTED |
| AUXILIARY CONSENSUS DECIDED VALUE | — | ACQUIRE AND STORE | ACQUIRE AND STORE |

FIG. 13

| TIMEOUT CONDITION 1 | PREDETERMINED TIMEOUT TIME To ELAPSES IN STATE IN WHICH DATA WITH IDENTIFICATION NUMBER n RECEIVED FROM DECISION NODE 1 IS NOT STORED IN DECISION MATRIX FOR NUMBER OF ESTIMATED Qs, WITHOUT BEING ABLE TO RECEIVE DATA WITH IDENTIFICATION NUMBER n FROM CLOCK TIME T_n (WHICH WILL BE DESCRIBED LATER) |
|---|---|
| TIMEOUT CONDITION 2 | PREDETERMINED TIMEOUT TIME To ELAPSES IN STATE IN WHICH DATA WITH IDENTIFICATION NUMBER n RECEIVED FROM DECISION NODE 1 IS STORED IN DECISION MATRIX FOR NUMBER OF CONFIRMED Qs, AND WHEN DATA WITH IDENTIFICATION NUMBER n OF DECISION MATRIX SATISFIES CONFIRMATION REQUIREMENT ACCORDING TO PROCESSING MODE IN TABLE 3 WITHOUT BEING ABLE TO RECEIVE DATA WITH IDENTIFICATION NUMBER n FROM CLOCK TIME T_n |
| CLOCK TIME T_n | CLOCK TIME SERVING AS REFERENCE FOR LAPSE OF TIMEOUT TIME To RELATING TO RECEPTION OF DATA WITH IDENTIFICATION NUMBER n. THIS IS CLOCK TIME AT WHICH DECISION NODE 2 ACQUIRES ANY DATA, FROM FIRST DATA TO IMMEDIATELY PRECEDING DATA OUT OF DATA WITH IDENTIFICATION NUMBER n. IT IS POSSIBLE TO ARBITRARILY DECIDE WHICH OF DATA WITH IDENTICAL IDENTIFICATION NUMBER n SHOULD BE SELECTED AS CLOCK TIME T_n AND OPERATE. |
| TIMEOUT TIME To | CLOCK TIME TO DECIDE TIMEOUT. ANY TIME CAN BE DECIDED TO OPERATE. |

FIG. 14

| | GENERAL MODE | PRIORITY VALUE MODE | PRIORITY NODE MODE |
|---|---|---|---|
| QUORUM CONDITION | · Qf ?? Qe<br>· 2Qe > N<br>· 2Qe + Qf > 2N | · Qf ?? Qe<br>· 2Qe > N<br>· Qe + Qf > N | · Qf ?? Qe<br>· 2Qe > N<br>· Qe + Qf > N |
| CONFIRMATION REQUIREMENT | ALL DATA IN DECISION MATRIX ARE SAME | ALL DATA IN DECISION MATRIX ARE SAME, AND THAT DATA IS SAME AS PRIORITY VALUE SET IN ADVANCE | ALL DATA IN DECISION MATRIX ARE SAME, AND THAT DATA HAVE BEEN RECEIVED FROM ANY PRIORITY NODES SET IN ADVANCE.<br>* "CONDITION ε": NUMBER OF PRIORITY NODES NEEDS TO MATCH NUMBER OF Qes. |
| ESTIMATED VALUE β | VALUE OF MORE THAN HALF OF MATCHED DATA IF ANY, OUT OF DATA IN DECISION MATRIX.<br>OTHERWISE, ANY DATA IN DECISION MATRIX. | PRIORITY VALUE IF ANY, FOUND IN DATA IN DECISION MATRIX.<br>OTHERWISE, DATA IN DECISION MATRIX. | VALUE OF DATA IF ANY, RECEIVED FROM PRIORITY NODE FOUND IN DATA IN DECISION MATRIX.<br>OTHERWISE, ANY DATA IN DECISION MATRIX. |

DISTRIBUTED CONSENSUS METHOD, DISTRIBUTED SYSTEM AND DISTRIBUTED CONSENSUS PROGRAM

BACKGROUND OF THE INVENTION

Field of the Invention

The present invention relates to a distributed consensus method, a distributed system and a distributed consensus program.

Description of the Related Art

There is a conventional technology described in WO2015/186191 that replicates and stores data in a plurality of servers to ensure availability. The publication includes a description of "a data management system including a plurality of servers each provided with a processor, a memory and a storage apparatus, the plurality of servers receiving and storing data, and replicating the data, each server including a first decision unit that decides consistency of the replicated data, a second decision unit, an allowable number of failures for the servers of which is larger than that of the first decision unit when deciding the consistency of the replicated data, but a minimum number of communications between the servers of which is larger than that of the first decision unit to decide the consistency of the replicated data, a combination unit that receives the data consistency decision result from the first decision unit or the second decision unit and outputs, when the decision result contains data that guarantees the consistency, the consistency-guaranteed data, and a data storage unit that stores the data outputted from the combination unit."

WO2015/186191 discloses a distributed system using a distributed consensus algorithm such as a PAXOS algorithm. In such a distributed system, a server apparatus with a similar specification is generally prepared as a sub to allow for failures. The distributed system that operates the distributed consensus algorithm cannot continue processing when majority of bases are stopped, and so more bases need to be added to the distributed system than the number of bases allowed to stop to improve fault tolerance. For example, if the number of bases that can cause failures is f, even with a conventional technology adopting a small total number of bases, the total number of bases is often 2f+1, and more than twice as many bases as the faulty bases needed to be secured. In this way, costs are more likely to increase to improve fault tolerance in the distributed system at low cost.

It is therefore an object of the present invention to improve fault tolerance of distributed systems.

SUMMARY OF THE INVENTION

In order to attain the above described object, one representative distributed consensus method of the present invention is a distributed consensus method for performing data consensus processing in a distributed system that couples one or more client apparatuses and a plurality of server apparatuses via a network, the method including a step in which each server apparatus performs data operation according to a predetermined distributed consensus algorithm, a step in which an auxiliary consensus device, which is an auxiliary device that assists in reaching consensus in the event of a failure in response to a request from each server apparatus, decides an auxiliary consensus decided value, a step in which the auxiliary consensus decided value takes precedence over the decided value of the distributed consensus algorithm under conditions under which the auxiliary consensus decided value decided by the auxiliary consensus device and the decided value decided by the distributed consensus algorithm can conflict with each other.

One representative distributed system of the present invention includes a plurality of server apparatuses coupled to one or more client apparatuses via a network and an auxiliary consensus device, which is an auxiliary device that assists in reaching consensus in the event of a failure in response to a request from each server apparatus, wherein the plurality of server apparatuses perform data consensus processing by data operation according to a predetermined distributed consensus algorithm and the auxiliary consensus decided value takes precedence over the decided value of the distributed consensus algorithm under conditions under which the auxiliary consensus decided value decided by the auxiliary consensus device and the decided value decided by the distributed consensus algorithm can conflict with each other.

One representative distributed consensus program of the present invention is a distributed consensus program that performs data consensus processing on a distributed system that couples one or more client apparatuses and a plurality of server apparatuses via a network, the program causing each server apparatus to execute a step of performing data operation according to a predetermined distributed consensus algorithm, a step of sending a request to an auxiliary consensus device, which is an auxiliary device that assists in reaching consensus in the event of a failure and deciding an auxiliary consensus decided value and a step of giving priority to the auxiliary consensus decided value over the decided value of the distributed consensus algorithm under conditions under which the auxiliary consensus decided value decided by the auxiliary consensus device and the decided value decided according to the distributed consensus algorithm can conflict with each other.

According to the present invention, it is possible to improve fault tolerance of a distributed system at low cost. Problems, configurations and effects other than those described above will be clarified in descriptions of the following embodiments.

BRIEF DESCRIPTION OF THE DRAWINGS

FIG. 7 is an explanatory diagram illustrating conditions for acquiring and rejecting data;

FIG. 13 is an explanatory diagram illustrating timeout conditions; and

FIG. 14 is an explanatory diagram illustrating conditions used in each processing mode.

DETAILED DESCRIPTION OF THE PREFERRED EMBODIMENTS

Figure 1:
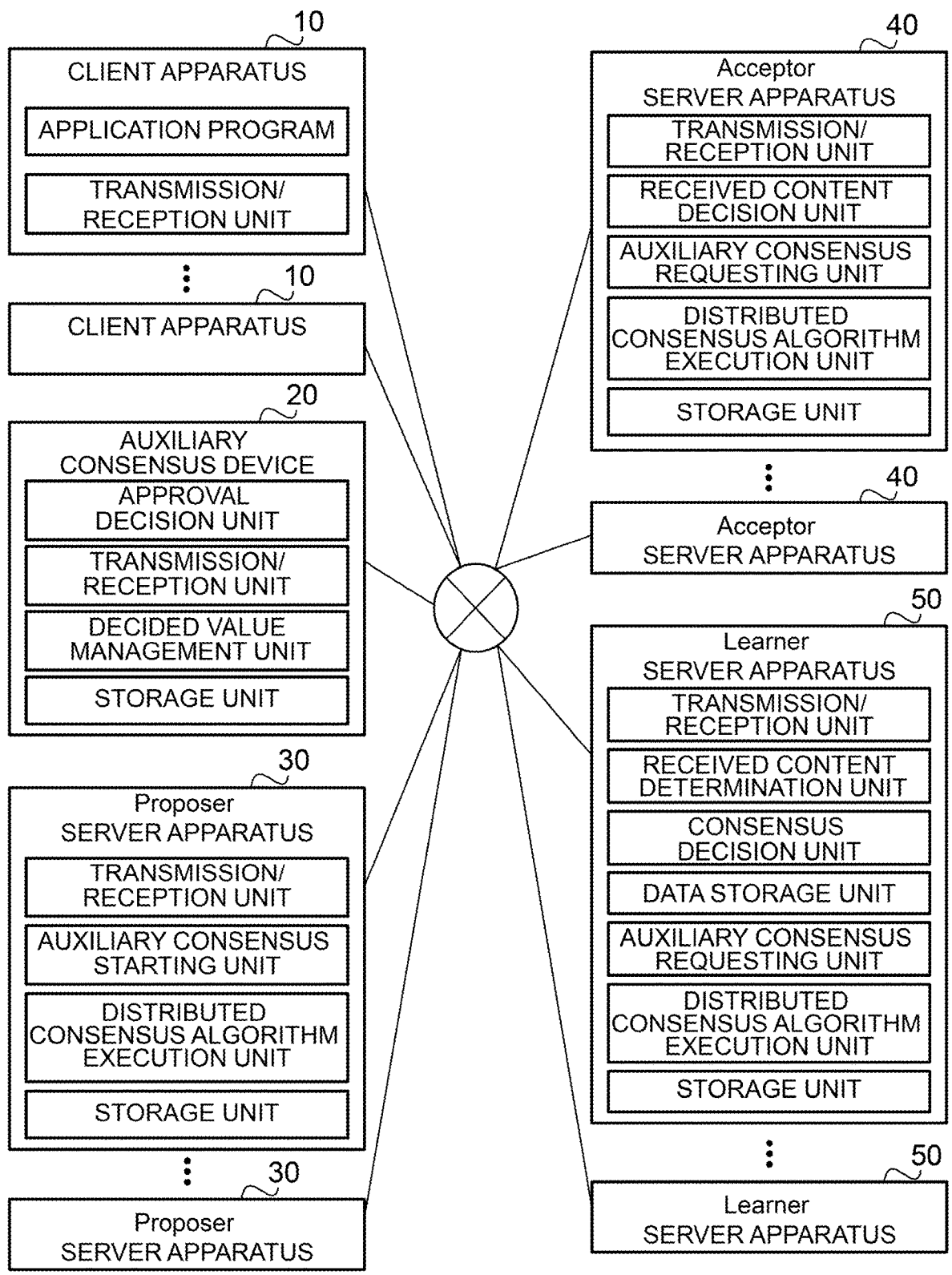
FIG. 1 is a system configuration diagram of a distributed system according to Embodiment 1.

Hereinafter, embodiments of the present invention will be described using the accompanying drawings.

The present invention adopts a scheme under which an auxiliary consensus device is further added to a normal base which would originally operate based on a distributed consensus algorithm, and if continuation of operation becomes impossible due to a failure, processing of the distributed consensus algorithm is continued through interaction between the normal base that can continue to operate and the auxiliary consensus device, thereby preventing outage of the distributed system itself.

Here, since only one base and one auxiliary consensus device should be operational, a total number of bases is f+1 bases if the number of bases in which failures can occur is f, and 2+f bases even if the auxiliary consensus device is counted. An increase in the total number of bases when an attempt is made to increase the number of failure tolerable bases is also smaller than in the prior art. Since the auxiliary consensus device may be a device that does not permanently have data ordered and stored with a distributed consensus and simply assists in distributed consensus processing, it can be operated with minimum storage and resources, and even need not be operated when there is no failure, and so it is possible to suppress cost compared to preparing one normal base.

When using the auxiliary consensus device, a possibility that a decided value of the original distributed consensus algorithm and a decided value of the auxiliary consensus device will conflict with each other has to be handled carefully. This is because if a situation is once created in which the decided value of the original distributed consensus algorithm is decided, and then the value needs to be changed, the distributed consensus algorithm itself loses the nature of consistency. However, if the decided value by the original distributed consensus algorithm conflicts with the auxiliary consensus device, the present invention adopts a rule that cannot propose the value for an apparatus that makes a final decision, adopts a mechanism for preventing the conflict before causing inconsistency, and has thereby been successful in preventing the conflict.

Embodiment 1

The distributed system of the present invention is constructed of a plurality of processing units (hereinafter referred to as "nodes") having specific roles. The distributed system of the present embodiment includes a node that assigns a unique proposal number to data and conducts voting, whereas the distributed system also has a node that proposes data, the node that conducts the proposal is called "Proposer." The distributed system also includes a node that holds the proposed data based on a certain rule for the proposal received from the node that conducts the proposal and conducts voting for the node that aggregates the proposal, and this node that conducts voting is called "Acceptor." The distributed system also includes a node that aggregates voting results received from the node that conducts voting one or more times and broadcasts data based on the results, and this node that conducts aggregation is called a "Learner." These nodes may be disposed on independent computer apparatuses or may be disposed on the same computer apparatus. In the present embodiment, the Proposer, Acceptor or Learner are assumed to perform processing identical or similar to the processing of the Proposer, Acceptor or Learner according to an existing Paxos algorithm except operations defined in the present invention. In the present embodiment, operation according to the Paxos algorithm is taken as an example, but the present invention is not limited to the aforementioned algorithm, and the present invention is also applicable to any distributed consensus algorithm having nodes having identical or similar processing or roles.

FIG. 1 is a system configuration diagram of the distributed system according to Embodiment 1 and illustrates a state in which the Proposer, Acceptor and Learner are disposed on different server apparatuses. In the distributed system shown in FIG. 1, one or more client apparatuses 10, one auxiliary consensus device 20 and a plurality of server apparatuses are coupled together via a network. The plurality of server apparatus include a plurality of Proposer server apparatuses 30, a plurality of Acceptor server apparatuses 40 and a plurality of Learner server apparatuses 50.

Each client apparatus 10 includes, for example, an application program and a transmission/reception unit. The auxiliary consensus device 20 includes, for example, an approval decision unit, a transmission/reception unit, a decided value management unit and a storage unit. The Proposer server apparatus 30 includes, for example, a transmission/reception unit, an auxiliary consensus starting unit, a distributed consensus algorithm execution unit and a storage unit. The Acceptor server apparatus 40 includes, for example, a transmission/reception unit, a received content decision unit, an auxiliary consensus requesting unit, a distributed consensus algorithm execution unit and a storage unit. The Learner server apparatus 50 includes, for example, a transmission/reception unit, a received content decision unit, a consensus decision unit, a distributed consensus algorithm execution unit and a storage unit.

In the present distributed system, the auxiliary consensus device does not operate under normal conditions, performs processing identical or similar to that of Prepare&Promise or Propose&Accept in the Paxos algorithm, and performs ordering. Even if a failure such as communication interruption occurs temporarily, processing is continued by retrying with a retry mechanism originally provided for the distributed consensus algorithm.

When operation of one Acceptor is completely stopped and it is impossible to continue with retries provided for the distributed consensus algorithm, the Proposer or Acceptor that continues to operate makes a request to the auxiliary consensus device and is thus allowed to use the auxiliary consensus device, and when the auxiliary consensus device returns approval to the received request, distributed consensus is thus completed, allowing the distributed system as a whole to continue to operate.

When communication among the Proposer, Acceptor and Learner is interrupted, and the Proposer or Acceptor recognizes that another node necessary to continue the processing has been stopped, each Proposer or Acceptor tries to use the auxiliary consensus device, but the auxiliary consensus device approves a request that arrives first and returns a rejection and a decided value to a request that arrives later, and can thereby prevent inconsistency.

Next, processing operation of each apparatus will be described. As a premise, the distributed system in FIG. 1 operates on the basis of the existing Paxos algorithm. According to the Paxos, Phase1 ends by receiving Promise requests from more than half of the aforementioned Acceptors (this set of necessary responses considered to be a majority is called "Prepare quorum") and Phase2 also ends when the Proposer or learner receives Accept requests from more than half of Acceptor (this set of necessary responses considered to be a majority is called "Accept quorum").

The distributed system according to Embodiment 1 adopts a scheme under which the number of necessary Prepare quorums or Accept quorums is considered to be a variable. A detailed method of deciding the number of Prepare quorums or Accept quorums will be described later.

Since the present embodiment is an embodiment based on the Paxos, the "distributed consensus algorithm execution unit" in the configuration diagram is supposed to execute the Paxos algorithm. A situation in which a "normal rejection" is transmitted from the Acceptor to the Proposer in a flowchart, which will be described later, is identical or similar to a situation in which the Acceptor does not accept Prepare or Propose from the Proposer in Phase1 Prepare & Promise or Phase2 Propose&Accept of Paxos processing and retry of consensus processing is necessary. According to the Paxos, the Proposer that has received the "normal rejection" retries a Prepare request with larger proposal numbers assigned to the subsequent proposals.

In present Embodiment 1, this proposal number is also held when the Proposer transmits an auxiliary consensus confirmation request to the Acceptor, and the Acceptor also continues to hold the proposal number of the received data. Here, the proposal number of the auxiliary consensus confirmation request and the proposal number of the Prepare request need not have to be distinguished. To decide whether or not the destination Acceptor has received the auxiliary consensus confirmation request, in the case where the auxiliary consensus confirmation request has been received, "normal rejection" to be transmitted by the Acceptor is transmitted with the information indicating that the auxiliary consensus confirmation request has been received, added to the normal rejection.

Figure 2:
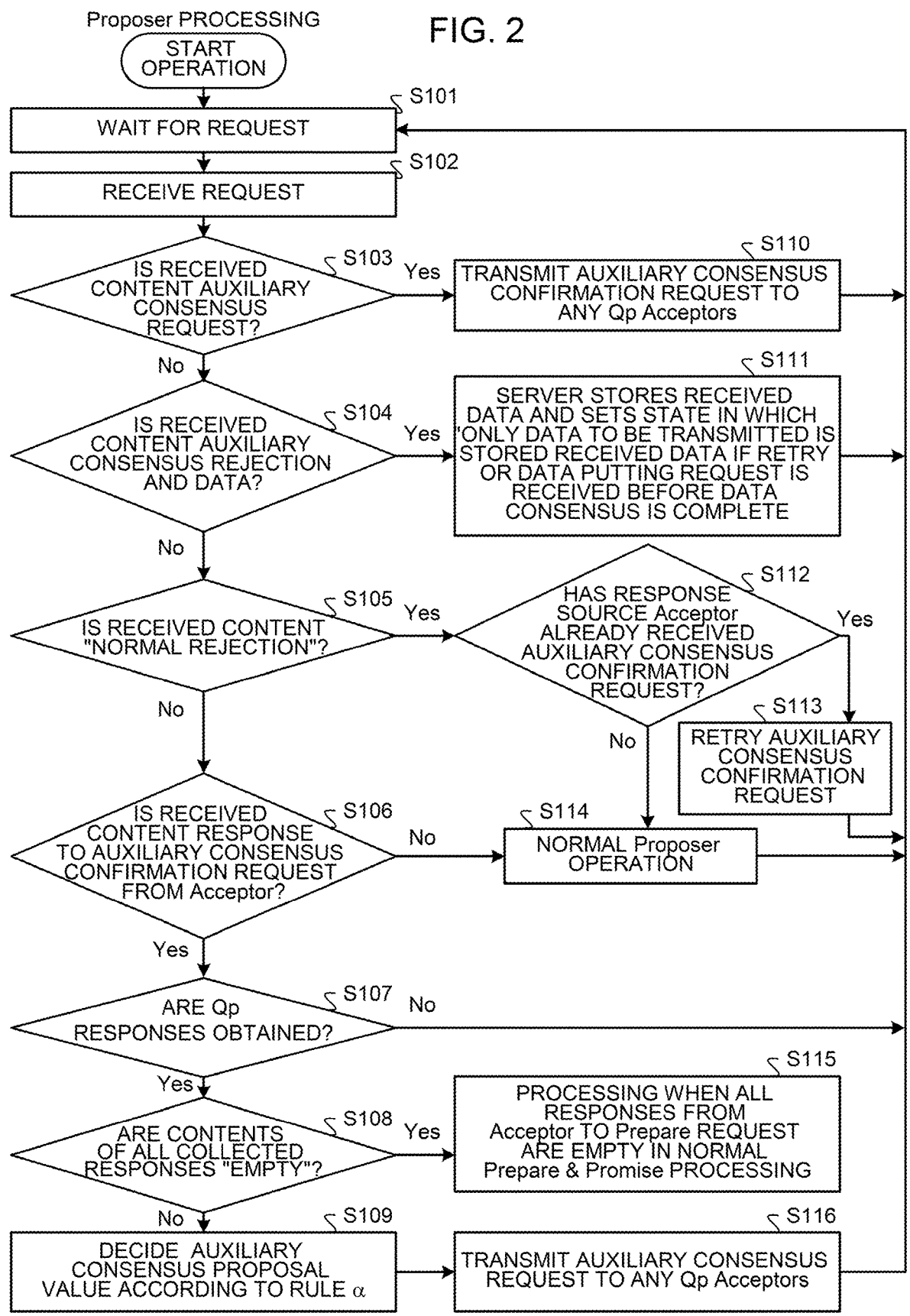
FIG. 2 is a flowchart describing consensus processing by Proposer.

FIG. 2 is a flowchart describing consensus processing by the Proposer. The Proposer server apparatus 30 starts the processing from following step S101.

Step S101

The Proposer server apparatus 30 waits for a request and the flow proceeds to step S102.

Step S102

The Proposer server apparatus 30 receive the request and the flow proceeds to step S103.

Step S103

The Proposer server apparatus 30 decides whether or not the received content is an auxiliary consensus request. If the received content is an auxiliary consensus request (step S103; Yes), the flow proceeds to step S110. If the received content is not an auxiliary consensus request (step S103; No), the flow proceeds to step S104.

Step S104

The Proposer server apparatus 30 decides whether or not the received content is an auxiliary consensus rejection and data. If the received content is an auxiliary consensus rejection and data (step S104; Yes), the flow proceeds to step S111. If the received content is not an auxiliary consensus rejection and data (step S104; No), the flow proceeds to step S105.

Step S105

The Proposer server apparatus 30 decides whether or not the received content is a "normal rejection." If the received content is a "normal rejection" (step S105; Yes), the flow proceeds to step S112. If the received content is not a "normal rejection" (step S105; No), the flow proceeds to step S106.

Step S106

The Proposer server apparatus 30 decides whether or not the received content is a response from the Acceptor to the auxiliary consensus confirmation request. If the received content is not a response from the Acceptor to an auxiliary consensus confirmation request (step S106; No), the flow proceeds to step S114. If the received content is a response from the Acceptor to an auxiliary consensus confirmation request (step S106; Yes), the flow proceeds to step 107.

Step S107

The Proposer server apparatus 30 decides whether or not Qp responses have been obtained. If Qp responses have not been obtained (step S107; No), the flow returns to step S101. If Qp responses have been obtained (step S107; Yes), the flow proceeds to step S108.

Step S108

The Proposer server apparatus 30 decides whether or not all the contents of the collected responses are "empty." If all the contents of the collected responses are "empty" (step S108; Yes), the flow proceeds to step S115. If all the contents of the collected responses are not "empty" (step S108; No), the flow proceeds to step S109.

Step S109

The Proposer server apparatus 30 decides an auxiliary consensus proposal value according to a rule a. After that, the flow proceeds to step S116.

Step S110

The Proposer server apparatus 30 transmits auxiliary consensus confirmation requests to any Qp Acceptors and the flow returns to step S101.

Step S111

The Proposer server apparatus 30 stores received data and is placed in a state in which "data to be transmitted when a retry or data put request has been received by the time a data consensus is completed, is only the stored received data." After that, the flow returns to step S101.

Step S112

The Proposer server apparatus 30 decides whether or not the response source Acceptor has received an auxiliary consensus confirmation request. If an auxiliary consensus confirmation request has been received (step S112; Yes), the flow proceeds to step S113 and if an auxiliary consensus confirmation request has not been received (step S112; No), the flow proceeds to step S114.

Step S113

The Proposer server apparatus 30 retries the auxiliary consensus confirmation request and the flow proceeds to step S101.

Step S114

The Proposer server apparatus 30 executes a normal Proposer operation and the flow returns to step S101.

Step S115

In normal prepare&promise processing, the Proposer server apparatus 30 executes processing for when all the responses from the Acceptor to a prepare request are empty. After that, the flow returns to step S101.

Step S116

The Proposer server apparatus 30 transmits auxiliary consensus requests to any Qp Acceptors and the flow returns to step S101.

Figure 3:
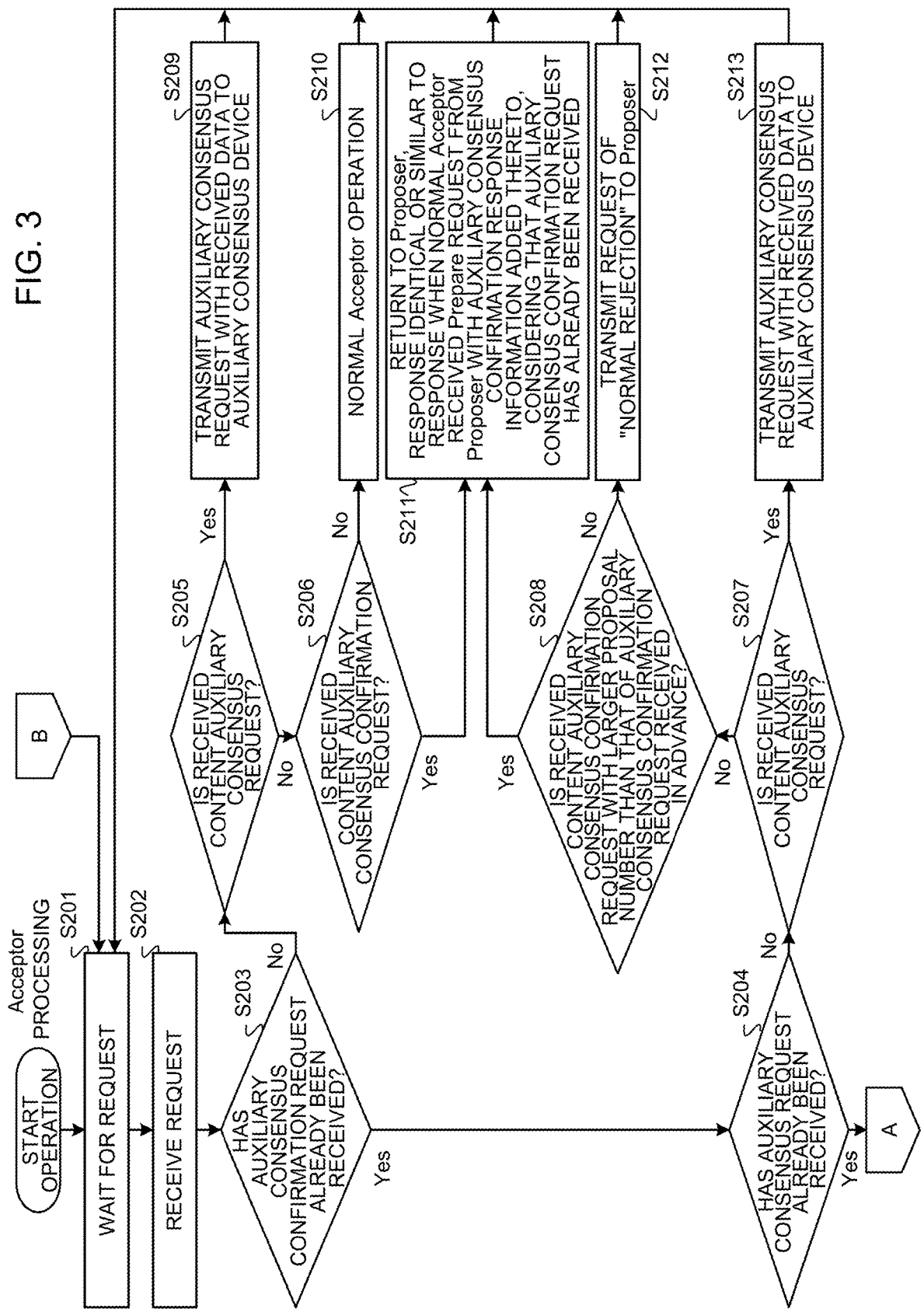
FIG. 3 is a flowchart (part 1) describing consensus processing by an Acceptor.
Figure 4:
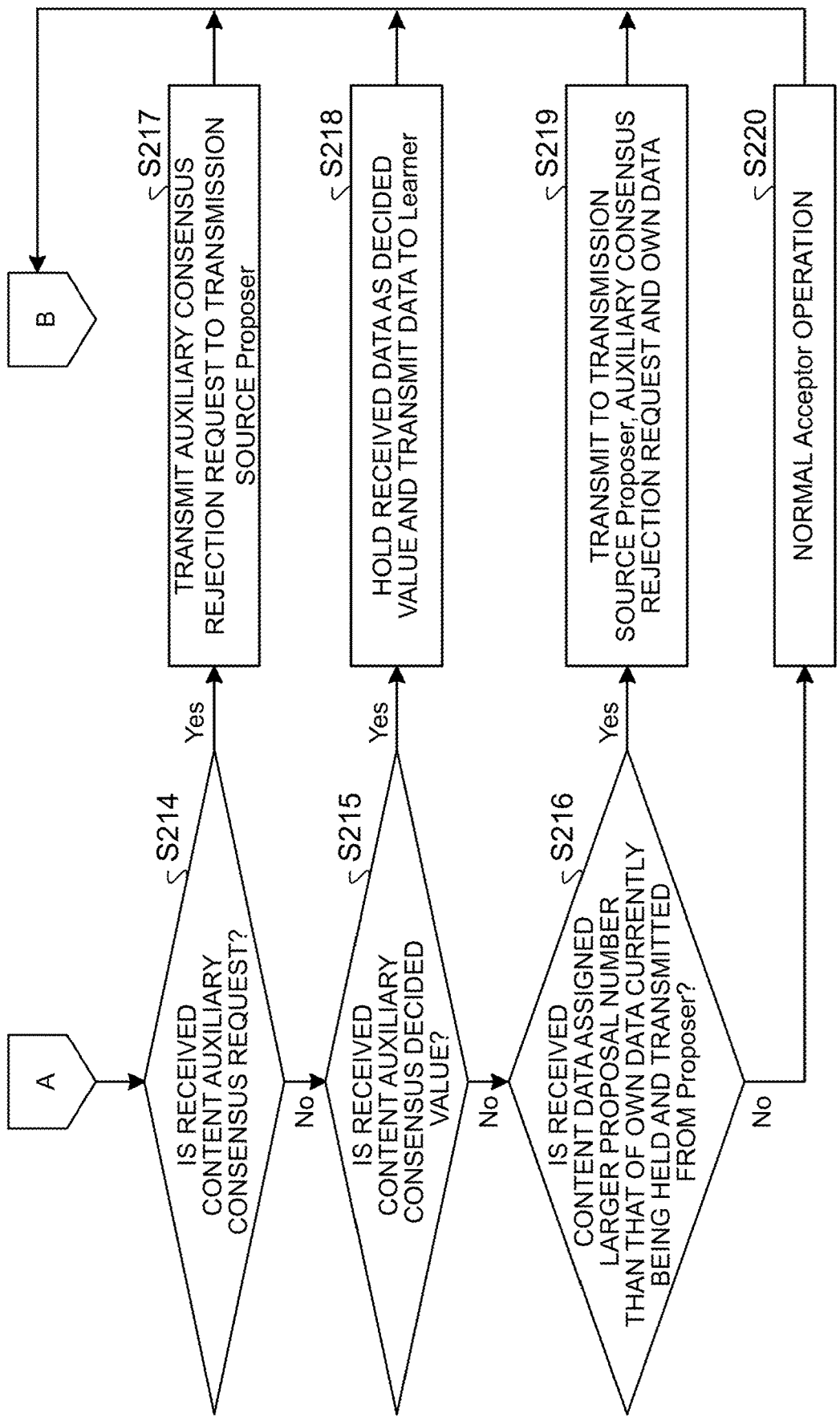
FIG. 4 is a flowchart (part 2) describing consensus processing by an Acceptor.

FIG. 3 and FIG. 4 are flowcharts describing consensus processing by the Acceptor. The Acceptor server apparatus 40 starts the processing from following step S201.

Step S201

The Acceptor server apparatus 40 waits for a request and the flow proceeds to step S202.

Step S202

The Acceptor server apparatus 40 receives the request and the flow proceeds to step S203.

Step S203

The Acceptor server apparatus 40 decides whether or not an auxiliary consensus confirmation request has already been received. If Yes, the flow proceeds to step S204, and if No, the flow proceeds to step S205.

Step S204

The Acceptor server apparatus 40 decides whether or not an auxiliary consensus request has already been received. If Yes, the flow proceeds to step S214 in FIG. 4. If No, the flow proceeds to step S207.

Step S205

The Acceptor server apparatus 40 decides whether or not the received content is an auxiliary consensus request. If Yes, the flow proceeds to step S209. If No, the flow proceeds to step S206.

Step S206

The Acceptor server apparatus 40 decides whether or not the received content is an auxiliary consensus confirmation request. If No, the flow proceeds to step S210. If Yes, the flow proceeds to step S211.

Step S207

The Acceptor server apparatus 40 decides whether or not the received content is an auxiliary consensus request. If No, the flow proceeds to step S208. If Yes, the flow proceeds to step S213.

Step S208

The Acceptor server apparatus 40 decides whether or not the received content is an auxiliary consensus confirmation request having a larger proposal number than that of the previously received auxiliary consensus confirmation request. If Yes, the flow proceeds to step S211. If No, the flow proceeds to step S212.

Step S209

The Acceptor server apparatus 40 transmits an auxiliary consensus request with received data to the auxiliary consensus device and the flow returns to step S201.

Step S210

The Acceptor server apparatus 40 executes normal Acceptor operation and the flow proceeds to step S201.

Step S211

The Acceptor server apparatus 40 considers that the auxiliary consensus confirmation request has already been received and the flow returns to the Proposer, a response identical or similar to the response when the normal Acceptor received a Prepare request from the Proposer with the auxiliary consensus confirmation response information added thereto. After that the flow returns to step S201.

Step S212

The Acceptor server apparatus 40 transmits a request for a "normal rejection" to the proposer and the flow returns to step S201.

Step S213

The Acceptor server apparatus 40 transmits an auxiliary consensus request with the received data to the auxiliary consensus device and the flow returns to step S201.

Step S214

The Acceptor server apparatus 40 decides whether or not the received content is an auxiliary consensus request. If Yes, the flow proceeds to step S217. If No, the flow proceeds to step S215.

Step S215

The Acceptor server apparatus 40 decides whether or not the received content is an auxiliary consensus decided value. If Yes, the flow proceeds to step S218. If No, the flow proceeds to step S216.

Step S216

The Acceptor server apparatus 40 decides whether or not the received content "is data transmitted from the Proposer and assigned a larger proposal number than that of own data currently being held". If Yes, the flow proceeds to step S219. If No, the flow proceeds to step S220.

Step S217

The Acceptor server apparatus 40 transmits a request for an auxiliary consensus rejection to the source Proposer and the flow returns to step S201.

Step S218

The Acceptor server apparatus 40 holds the received data as a decided value, transmits the data to the Learner and the flow returns to step S201.

Step S219

The Acceptor server apparatus 40 transmits the auxiliary consensus rejection request and own data to the source Proposer and the flow returns to step S201.

Step S220

The Acceptor server apparatus 40 performs a normal Acceptor operation and the flow returns to step S201.

Figure 5:
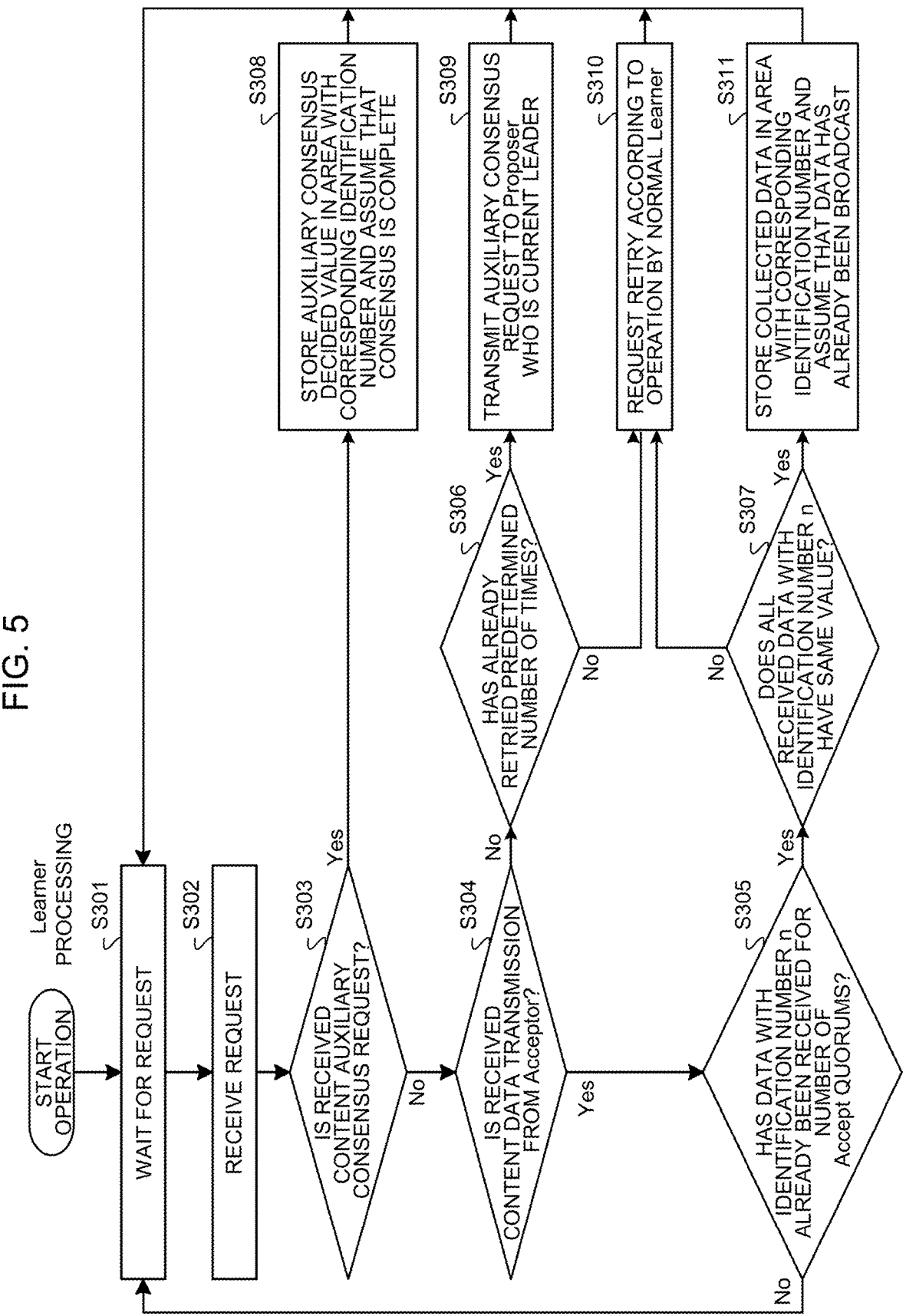
FIG. 5 is a flowchart describing consensus processing by a Learner.

FIG. 5 is a flowchart describing consensus processing by the Learner. The Learner server apparatus 50 starts the processing from following step S301.

Step S301

The Learner server apparatus 50 waits for a request and the flow proceeds to step S302.

Step S302

The Learner server apparatus 50 receive the request and the flow proceeds to step S303.

Step S303

The Learner server apparatus 50 decides whether or not the received content is an auxiliary consensus request. If Yes, the flow proceeds to step S308 and if No, the flow proceeds to step S304.

Step S304

The Learner server apparatus 50 decides whether or not the received content is data transmission from the Acceptor. If No, the flow proceeds to step S306, and if No, the flow proceeds to step S305.

Step S305

The Learner server apparatus 50 decides whether or not data with an identification number n has already been received for the number of Accept quorums. If Yes, the flow proceeds to step S307, and if No, the flow returns to step S301.

Step S306

The Learner server apparatus 50 decides whether or not a predetermined number of retries have already been made. If Yes, the flow proceeds to step S309, and if No, the flow proceeds to step S310.

Step S307

The Learner server apparatus 50 decides whether or not the all received data with an identification number n have identical values. If No the flow proceeds to step S310, and if Yes, the flow proceeds to step S311.

Step S308

The Learner server apparatus 50 stores an auxiliary consensus decided value in an area with a corresponding identification number, and considers that the consensus is complete. After that, the flow returns to step S301.

Step S309

The Learner server apparatus 50 transmits an auxiliary consensus request to the Proposer, a current leader. After that, the flow returns to step S301.

Step S310

The Learner server apparatus 50 requests a retry according to a normal Learner operation. After that, the flow returns to step S301.

Step S311

The Learner server apparatus 50 stores collected data in an area with a corresponding identification number and considers that the data has already been broadcast. After that, the flow returns to step S301.

Figure 6:
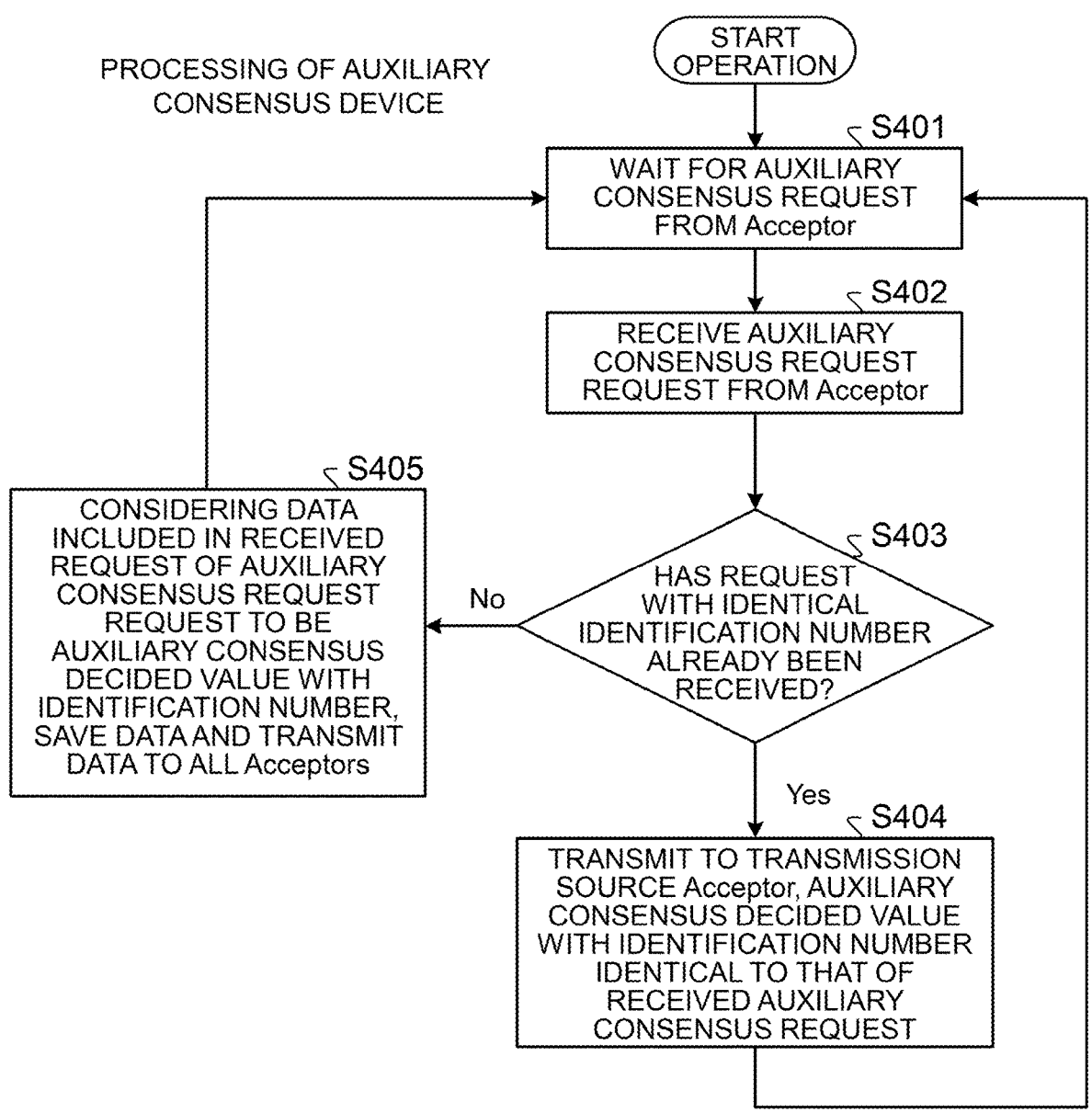
FIG. 6 is a flowchart describing consensus processing in an auxiliary consensus device.

FIG. 6 is a flowchart describing consensus processing in the auxiliary consensus device. The auxiliary consensus device 20 starts the processing from following step S401.

Step S401

The auxiliary consensus device 20 waits for an auxiliary consensus request from the Acceptor and the flow proceeds to step S402.

Step S402

The auxiliary consensus device 20 receives an auxiliary consensus request request from the Acceptor and the flow proceeds to step S403.

Step S403

The auxiliary consensus device 20 decides whether or not a request with an identical identification number has already been received. If Yes, the flow proceeds to step S404, and if No, the flow proceeds to step S405.

Step S404

The auxiliary consensus device 20 transmits to the source Acceptor, an auxiliary consensus decided value with an identification number identical to that of the received auxiliary consensus request and the flow returns to step S401.

Step S405

The auxiliary consensus device 20 considers data included in the received auxiliary consensus request request to be an auxiliary consensus decided value for the identification number, saves the data and transmits the data to all the Acceptors. After that, the flow returns to step S401.

With the distributed system of Embodiment 1, when the Proposer transmits the data received from the client apparatus to subsequent processes, the Proposer transmits the data with an identification number n assigned thereto and also handles the data with the identical identification number n assigned thereto when performing transmission/reception relating to the data during communication between processes. The identification number n is updated to a larger value every time the Proposer receives and puts a new value from the client apparatus. The flowcharts of the Proposer, Acceptor and Learner are not flowcharts showing operations of the apparatuses, but flowcharts of processes carrying out consensus processing. For this reason, every time an identification number is changed, for example, incremented, a process (function) of the Proposer, Acceptor or Learner corresponding to the identification number is started one by one in each server apparatus.

The client apparatus 10 puts data to the Proposer corresponding to the identification number and then proceeds to subsequent processes in the form of transmitting data with the identification number identical to that of a process with the identical identification number for data communication among the Proposer, Acceptor and Learner. On the other hand, with regard to the auxiliary consensus device 20, the present embodiment adopts a mechanism of distinguishing the identical identification number, and so the auxiliary consensus device need not be started for each identification number, whereas it is also possible to adopt a rule that starts a process for processing auxiliary consensus devices for each identification number and does not differentiate by identification number in the flowchart.

As described above, in the embodiment according to the Paxos algorithm, the distributed consensus performs consensus processing by (1) Prepare&Promise of an operation of the Proposer storing data in the Acceptor and by (2) Propose&Accept of an operation of the Acceptor storing data in the Learner. Here, a data set obtained by the Proposer aggregating response data from the Acceptor in (1) is called a "Prepare quorum (Qp)" and a data set obtained by the Learner aggregating data transmission requests from the Acceptor in (2) is called an "Accept quorum (Qa)."

The number of Acceptors and pieces of data selected by the Proposer to transmit an auxiliary consensus confirmation request to the Acceptors and aggregate responses is Qp to operate. In the present embodiment, Qp, Qf, a total number of Acceptors (N) and an allowable number of failures (f) of the Acceptor are established under the following conditions:

$$Qp+Qa>N$$

$$Qp \leq (N-f)$$

Here, N becomes minimum when Qp=1, Qa=N, N=f+1, and since N=2 is minimum, consensus processing on a distributed arrangement with two physical machines and two bases is possible as a minimum configuration.

When no consensus can be achieved by repeating retries to collect the same data for the number of Qas, the Learner transmits an auxiliary consensus request to the Proposer. Here, when the Learner transmits the auxiliary consensus request to the Proposer, the Proposer transmits an auxiliary consensus confirmation request to the Acceptor with the own proposal number assigned thereto (as the proposal number, not only the one used for Prepare, but also the one used for the auxiliary consensus confirmation request may be managed separately). Upon receiving the auxiliary consensus confirmation request, the Acceptor transmits a rejection or data to the Proposer under the same conditions described in the flowchart. When responses are collected and there is no rejection, the Proposer transmits an auxiliary consensus request together with the proposal value to the Acceptor and the Acceptor transmits the auxiliary consensus request together with the proposal value to the auxiliary consensus device.

Here, as described above, the present embodiment adopts a scheme for transmitting an auxiliary consensus request from the Proposer to the auxiliary consensus device via the Acceptor. However, as the path the auxiliary consensus request takes from the Proposer to the auxiliary consensus device, the auxiliary consensus request may directly arrive at the auxiliary consensus device without going through the Acceptor. The "rule a" referred to in the flowchart of the Proposer is assumed to be a rule that decides data having the largest proposal number among the Prepare quorums as the proposal value. As the data which may be received by the Acceptor, two kinds of data can be enumerated: data with the auxiliary consensus decided value when the auxiliary consensus decided value is transmitted to the Acceptor as in this case, and data transmitted from the Proposer. Whether to store or reject the data is decided based on conditions as shown in FIG. 7 together with the source Paxos algorithm in the present embodiment. Note that a rejection when the auxiliary consensus decided value is held is transmitted as an auxiliary consensus rejection request.

FIG. 7 is an explanatory diagram illustrating conditions for acquiring and rejecting data. As shown in FIG. 7, the received data is rejected when the received data has a normal decided value, the proposal number of the received data is larger than that of the data held, and the auxiliary consensus decided value is held. The received data is acquired and stored when the received data has a normal decided value, the proposal number of the received data is larger than that of the data held and the auxiliary consensus decided value is held.

The received data is rejected when the received data has a normal decided value and the proposal number of the received data is smaller than that of the data held, even if either the auxiliary consensus decided value or the normal decided value is held. If the received data has the auxiliary consensus decided value, the received data is acquired and stored regardless of whether the data holds a consensus decided value or a normal decided value.

Embodiment 2

Figure 8:
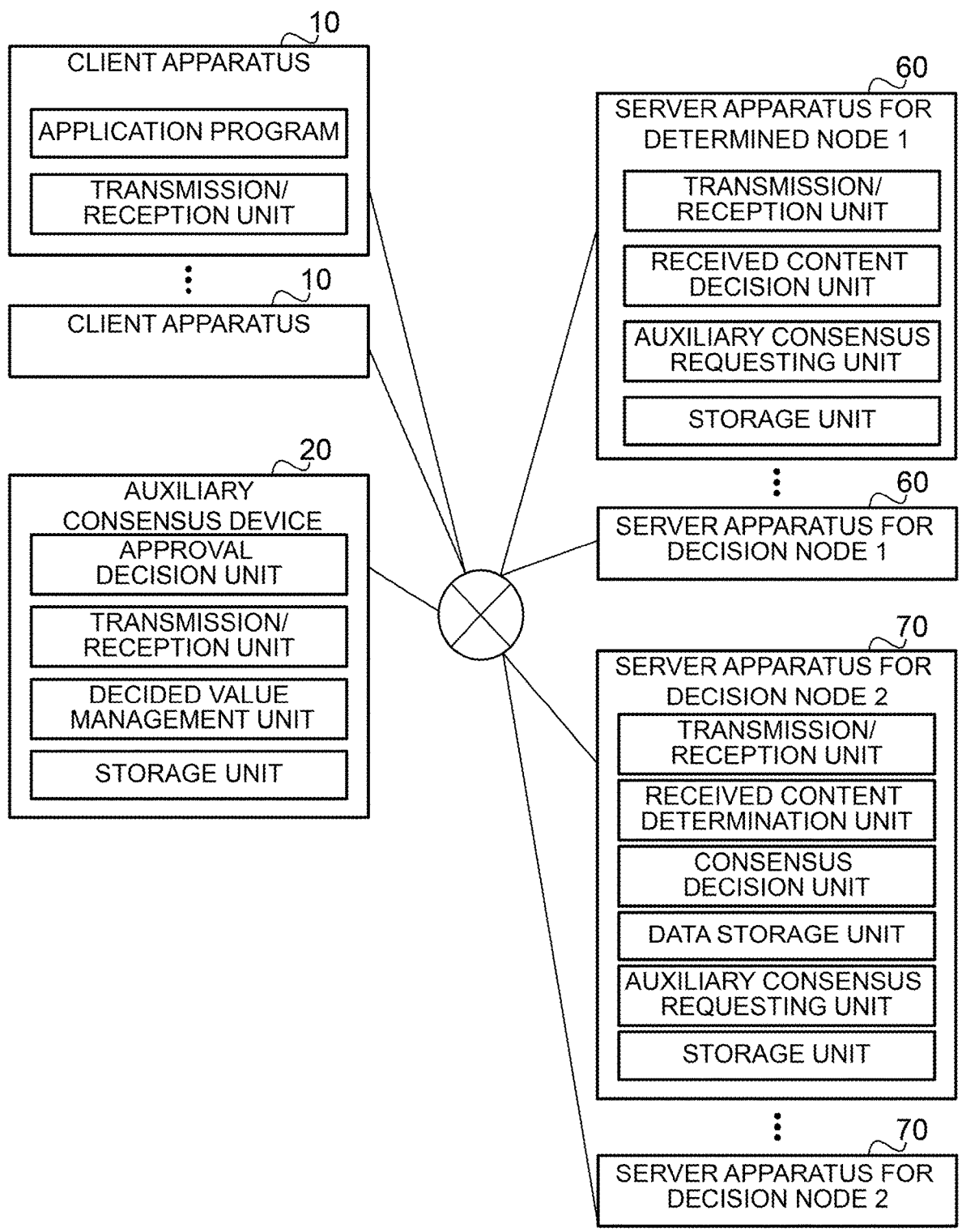
FIG. 8 is a system configuration diagram of a distributed system according to Embodiment 2.

FIG. 8 is a system configuration diagram of a distributed system according to Embodiment 2. The distributed system shown in FIG. 8 includes one or more client apparatuses 10, one auxiliary consensus device 20 and a plurality of server apparatuses, coupled together via a network. The plurality of server apparatuses include a plurality of server apparatuses 60 for a decision node 1 and a plurality of server apparatuses 70 for a decision node 2.

The client apparatus 10 includes, for example, an application program and a transmission/reception unit. The auxiliary consensus device 20 includes, for example, an approval decision unit, a transmission/reception unit, a decided value management unit and a storage unit. The server apparatus 60 for the decision node 1 includes, for example, a transmission/reception unit, a received content decision unit, an auxiliary consensus requesting unit and a storage unit. The server apparatus 70 for the decision node 2 includes, for example, a transmission/reception unit, a received content decision unit, a consensus decision unit, a data storage unit, an auxiliary consensus requesting unit and a storage unit.

Figure 9:
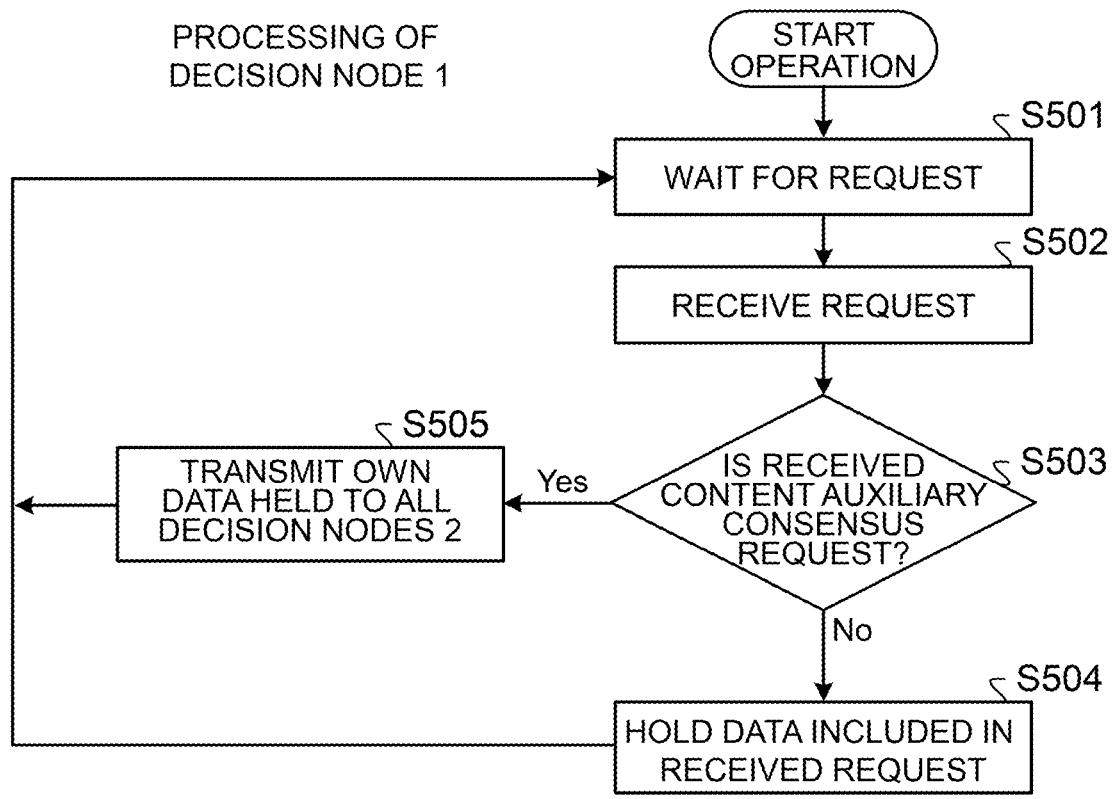
FIG. 9 is a flowchart describing consensus processing in a decision node 1.

FIG. 9 is a flowchart describing consensus processing in the decision node 1. The server apparatus 60 for the decision node 1 starts the processing from following step S501.

Step S501

The server apparatus 60 for the decision node 1 waits for a request and the flow proceeds to step S502.

Step S502

The server apparatus 60 for the decision node 1 receives the request and the flow proceeds to step S503.

Step S503

The server apparatus 60 for the decision node 1 decides whether or not the received content is an auxiliary consensus request. If the received content is an auxiliary consensus request (step S503; Yes), the flow proceeds to step S505. If the received content is not an auxiliary consensus request (step S503; No), the flow proceeds to step S504.

Step S504

The server apparatus 60 for the decision node 1 holds data included in the received request and the flow returns to step S501.

Step S505

The server apparatus 60 for the decision node 1 transmits own data to all the decision nodes 2 and the flow returns to step S501.

Figure 10:
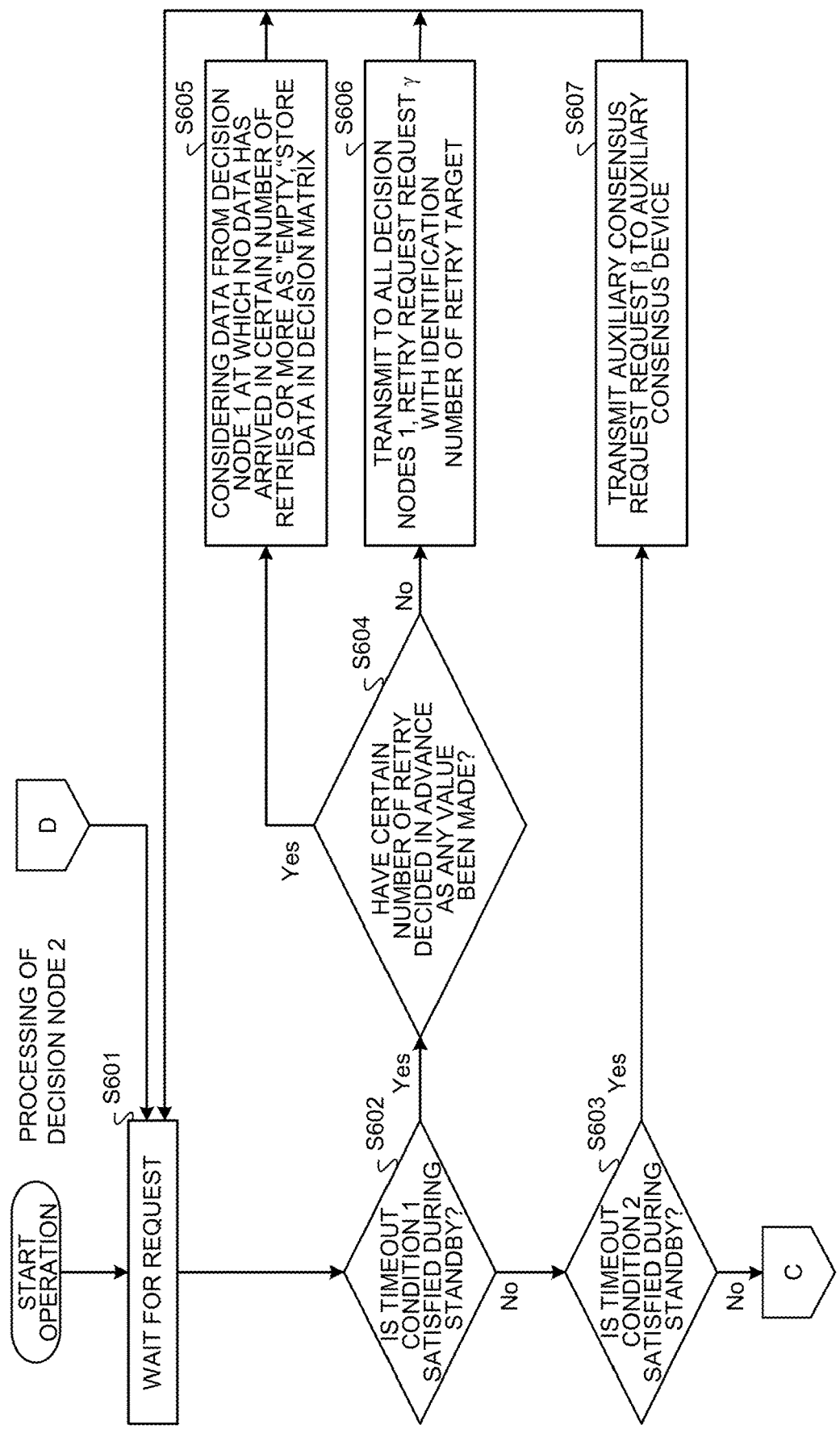
FIG. 10 is a flowchart (part 1) describing consensus processing in a decision node 2.
Figure 11:
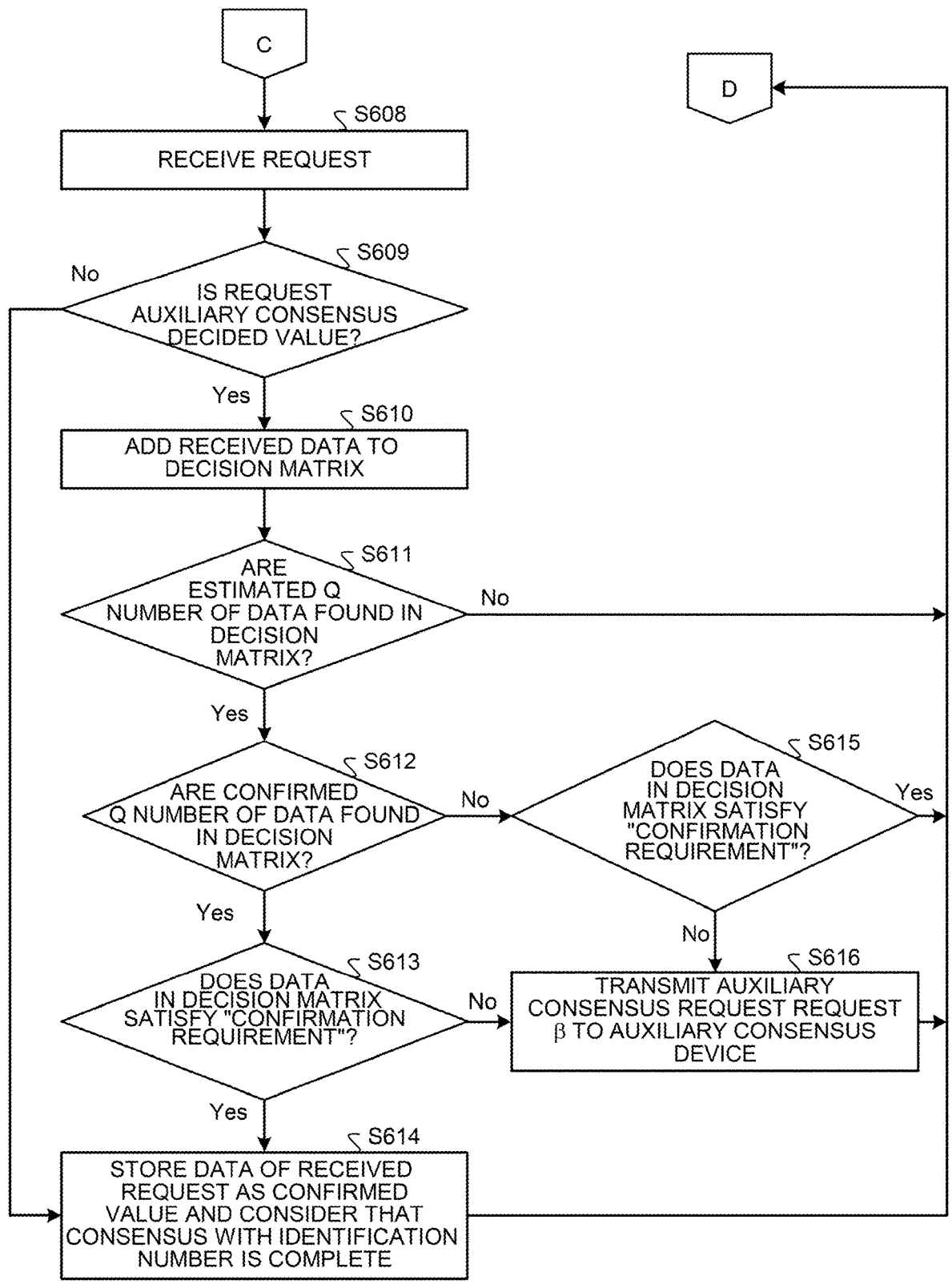
FIG. 11 is a flowchart (part 2) describing consensus processing in the decision node 2.

FIG. 10 and FIG. 11 are flowcharts describing consensus processing in the decision node 2. The server apparatus 70 for the decision node 2 starts the processing from following step S601.

Step S601

The server apparatus 70 for the decision node 2 waits for a request and the flow proceeds to step S602.

Step S602

The server apparatus 70 for the decision node 2 decides whether or not a timeout condition 1 is satisfied during standby. If Yes, the flow proceeds to step S604 and if No, the flow proceeds to step S603.

Step S603

The server apparatus 70 for the decision node 2 decides whether or not a timeout condition 2 has been satisfied during standby. If Yes, the flow proceeds to step S607, and if No, the flow proceeds to step S608 in FIG. 11.

Step S604

The server apparatus 70 for the decision node 2 decides whether or not a certain number of retries, decided in advance as any value, have been made. If Yes, the flow proceeds to step S605, and if No, the flow proceeds to step S606.

Step S605

The server apparatus 70 for the decision node 2 considers data from the decision node 1, which has not arrived on a certain number or more retries to be "empty" and stores the data in a decision matrix. After that, the flow returns to step S601.

Step S606

The server apparatus 70 for the decision node 2 transmits a retry request request γ with an identification number of a retry target to all the decision nodes 1. After that, the flow returns to step S601.

Step S607

The server apparatus 70 for the decision node 2 transmits an auxiliary consensus request request β to the auxiliary consensus device. After that, the flow returns to step S601.

Step S608

The server apparatus 70 for the decision node 2 receives a request and the flow proceeds to step S609.

Step S609

The server apparatus 70 for the decision node 2 decides whether or not the request is an auxiliary consensus decided value. If No, the flow proceeds to step S614. If Yes, the flow proceeds to step S610.

Step S610

The server apparatus 70 for the decision node 2 adds the received data to a decision matrix, and the flow proceeds to step S611.

Step S611

The server apparatus 70 for the decision node 2 decides whether or not an estimated Q number of data is in the decision matrix. If No, the flow returns to step S601, and if Yes, the flow proceeds to step S612.

Step S612

The server apparatus 70 for the decision node 2 decides whether or not a confirmed Q number of data is in the decision matrix. If No, the flow proceeds to step S615, and if Yes, the flow proceeds to step S613.

Step S613

The server apparatus 70 for the decision node 2 decides whether or not the data in the decision matrix satisfies the "confirmation requirement." If No, the flow proceeds to step S616, and if Yes, the flow proceeds to step S614.

Step S614

The server apparatus 70 for the decision node 2 stores data of the received request as a confirmed value and completes the consensus with the identification number. After that, the flow proceeds to step S601.

Step S615

The server apparatus 70 for the decision node 2 decides whether or not the data in the decision matrix satisfies the "confirmation requirement." If Yes, the flow returns to step S601, and if No, the flow proceeds to step S616.

Step S616

The server apparatus 70 for the decision node 2 transmits the auxiliary consensus request request β to the auxiliary consensus device and the flow returns to step S601.

Figure 12:
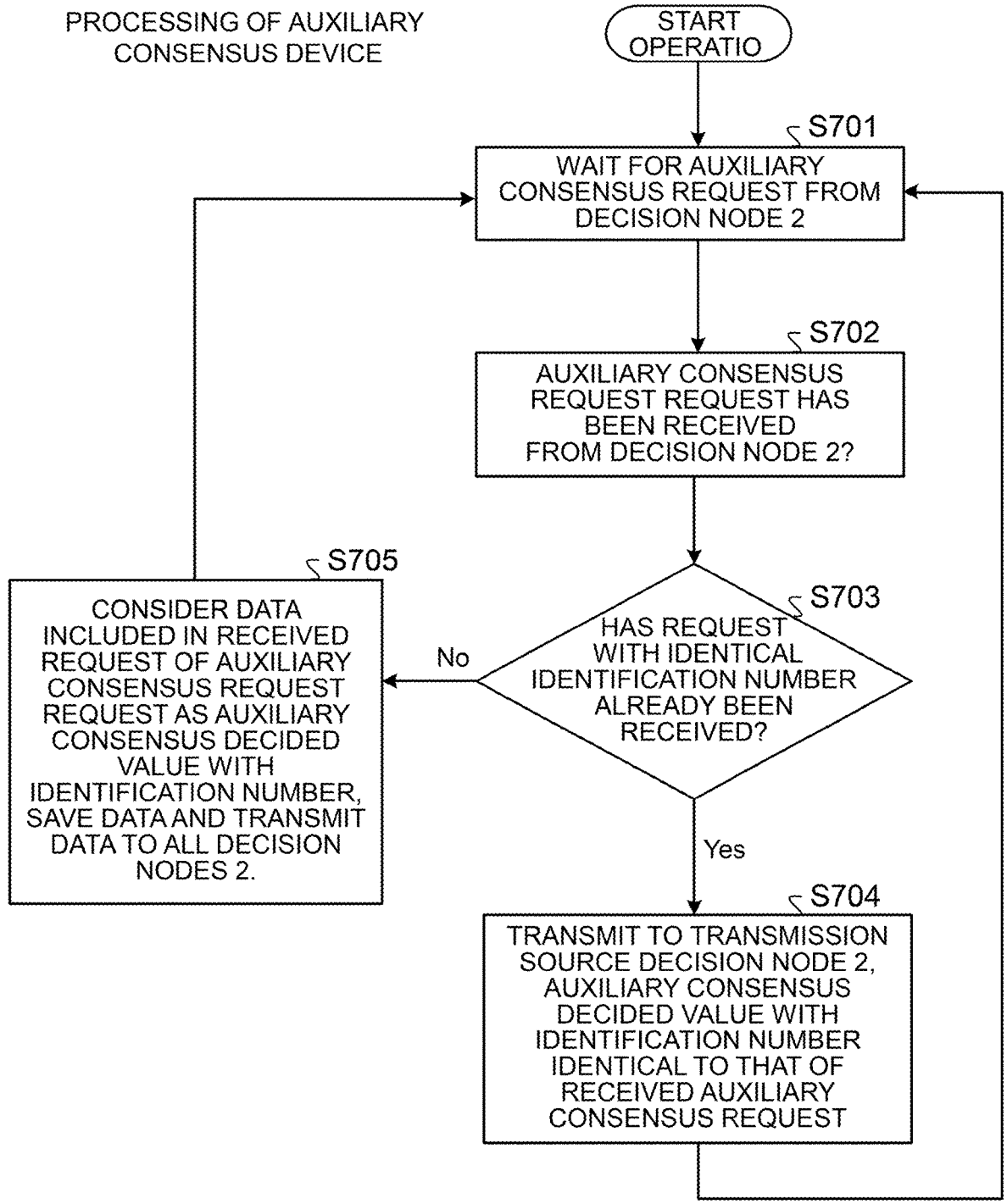
FIG. 12 is a flowchart describing consensus processing in an auxiliary consensus device.

FIG. 12 is a flowchart describing consensus processing in the auxiliary consensus device. The auxiliary consensus device 20 starts the processing from following step S701.

Step S701

The auxiliary consensus device 20 waits for an auxiliary consensus request from the decision node 2 and the flow proceeds to step S702.

Step S702

The auxiliary consensus device 20 receives an auxiliary consensus request request from the decision node 2 and the flow proceeds to step S703.

Step S703

The auxiliary consensus device 20 decides whether or not a request with the same identification number has already been received. If Yes, the flow proceeds to step S704, and if No, the flow proceeds to step S705.

Step S704

The auxiliary consensus device 20 transmits an auxiliary consensus decided value with an identification number identical to that of the received auxiliary consensus request to the source decision node 2 and the flow returns to step S701.

Step S705

The auxiliary consensus device 20 saves data included in the received auxiliary consensus request request as an auxiliary consensus decided value with the identification number and transmits the data to all the decision nodes 2. After that, the flow returns to step S701.

Thus, the distributed system according to Embodiment 2 performs consensus processing by putting data from the client apparatus 10 to the decision node 2, and in that case, the client apparatus 10 puts the data with an identification number n assigned thereto. The client apparatus 10 considers that the decision node 2 has completed the consensus for the data with the identification number n, and then puts the data with an identification number n' which is unused yet assigned to the data put from the client as an identification number. It is ensured that a unique identification number is assigned to each consensus process completion.

Here, as in the case of Embodiment 1 where a use example based on the Paxos algorithm has been presented, the flowchart disclosed in Embodiment 2 does not correspond to the apparatus, but is a flowchart of processes used for the consensus processing, and so the decision node 1 or the decision node 2 starts one process at a time in each server apparatus for each identification number. Regarding the auxiliary consensus device 20, even if the apparatus is started for each identification number, one process may be reused by distinguishing the identification numbers.

Until the formation of a consensus is completed, the decision node 2 holds the data received from each decision node 1 in a form temporarily called a "decision matrix." An identifier such as an ID of the source decision node 1 and the received data itself are held in the decision matrix and an aggregation process which will be described later will be performed from the data in the decision matrix.

In data aggregation for the consensus processing, the decision node 2 performs consensus processing using data for the number of sets called a "quorum." The distributed system of Embodiment 2 performs consensus processing using a set "confirmed quorum" capable of performing high-speed consensus processing and using a set "estimated quorum" when performing the consensus processing using the auxiliary consensus device.

Examples of processing modes in Embodiment 2 include a general mode, a priority value mode and a priority node mode, and the processing is performed in a predetermined processing mode. In the priority value mode, high-speed consensus processing is performed to make a consensus to predetermined one specific value. In the priority node mode, the decision node 1 predetermined according to a "condition ε" in FIG. 14, which will be described later, among the decision nodes 1 is called a "priority node" and a high-speed consensus processing is performed when a consensus is made using data transmitted from the priority node set, which is a set of such nodes. The general mode is a mode without such conditions.

Assuming that the number of confirmed quorums (confirmed Qs) is Qe, the number of estimated quorums (estimated Qs) is Qf and the total number of bases is N, these quorums can be correctly operated with Qf and Qe that satisfy quorum conditions in FIG. 14 depending on the processing mode.

A condition under which the total number of bases N which is the number of decision nodes 1 necessary for operation can be minimized is N=Qe, Qf=1 and f=N−1, and a minimum configuration with N=2 is implemented. Instead, if even one decision node 1 falls, it will be necessary to use the auxiliary consensus device from a retry, and so a high-speed consensus cannot further be made.

Here, Qe is a number to collect a confirmed Q number of data in the decision matrix and make a consensus, and when this confirmed Q number of data are collected, the number of communication steps until a consensus is achieved can be minimized. Therefore, when there is a difference in the number of bases between N and Qe, even when the corresponding number of decision nodes 1 fail, a high-speed consensus using the confirmed Q data can be achieved.

The timeout condition 1 and the timeout condition 2 in the flowchart of the decision node 2 will follow rules in FIG. 13 and FIG. 14.

FIG. 13 is an explanatory diagram about timeout conditions. As shown in FIG. 13, the timeout condition 1 is: "a predetermined timeout time To elapses in a state in which data having an identification number n received from the decision node 1 is not stored in the decision matrix for the number of estimated Qs, without being able to receive data with the identification number n from a clock time $T\_n$ (which will be described later)."

The timeout condition 2 is: "a predetermined timeout time To elapses in a state in which data having an identification number n received from the decision node 1 is stored in the decision matrix for the number of estimated Qs, and when the data with the identification number n in the decision matrix satisfies a confirmation requirement according to a processing mode in Table 3 without being able to receive the data with the identification number n from a clock time $T\_n$."

The clock time T_n is a clock time serving as a reference for the lapse of timeout time To relating to the reception of the data with the identification number n. This is a clock time at which the decision node 2 acquired any one of the data with the identification number n, from the first to the immediately preceding one. Which of the data with the identical identification number n should be selected as the acquisition time may be arbitrarily decided for the clock time T_n to operate.

The timeout time To is a clock time to decide the timeout, and any time may be decided to operate.

FIG. 14 is an explanatory diagram about conditions to be used in each processing mode. As shown in FIG. 14, quorum conditions in the general mode are:

"$Qf \leq Qe$ $2Qe > N$ $2Qe + Qf > 2N$."

Furthermore, the general mode confirmation requirement is that "all data in the decision matrix are the same" and the estimated value β is "a value of more than half of matched data, if any, out of data in the decision matrix. Otherwise, any data in the decision matrix."

The quorum conditions in the priority value mode are:

"$Qf \leq Qe$ $2Qe > N$ $Qe + Qf > N$."

The general mode confirmation requirement is that "all the data in the decision matrix are the same, and the data is the same as the priority value set in advance" and the estimated value β is "a priority value, if any, found in the data in the decision matrix. Otherwise, any data in the decision matrix."

The quorum conditions in the priority node mode are:

"$Qf \leq Qe$ $2Qe > N$ $Qe + Qf > N$."

The general mode confirmation requirements are "all the data in the decision matrix are the same and the data have been received from any priority nodes set in advance. * "condition ε": the number of priority nodes need to match the number of Qes," and the estimated value β is "a value of data if there is any data received from the priority node in the decision matrix. Otherwise, any data in the decision matrix."

The auxiliary consensus request β in the flowchart of the decision node 2 selects a proposal value according to the estimated value β in FIG. 14 depending on the processing mode out of data in the decision matrix of the decision node 2 and transmits the proposal value to the auxiliary consensus device 20. The retry request request γ in FIG. 14 is a request for proceeding with the consensus processing in the system again.

Here, if data is transmitted without making any special request, the decision node 1 transmits data to each decision node 2 again, and so, the data is simply transmitted in the present embodiment 2. The substance of the transmitted content of the retry request request is to transmit data arbitrarily selected from data held in the decision matrix by the decision node 2 itself or a state "empty" if there is no data.

The "confirmation requirement" in the flowchart of the decision node 2 is a confirmation requirement depending on the processing mode in FIG. 14.

When the distributed systems disclosed in Embodiment 1 and Embodiment 2 are actually constructed, the Proposer, Acceptor, Learner, decision node 1 and decision node 2 can be disposed in any apparatus or place. For example, it is possible to dispose the Proposer, Acceptor and Learner, for example, in two bases or dispose the decision node 1 and the decision node 2 in two bases.

Buildings, rooms, one computer apparatus or the like can be used as the unit of the bases. When different roles in the distributed consensus algorithm (Proposer, Acceptor, Learner, decision node 1 and decision node 2) are placed on the same computer apparatus, data can be delivered between different roles on a memory instead of communication.

As described so far, the distributed consensus method according to each embodiment is a distributed consensus method for performing data consensus processing on a distributed system in which one or more client apparatuses 10 and a plurality of server apparatuses (30, 40, 50, 60, 70), coupled together via a network, the method including a step in which each server apparatus performs data operation according to a predetermined distributed consensus algorithm, a step in which an auxiliary consensus device 20, which is an auxiliary device that assists in reaching a consensus in the event of a failure in response to a request from the server apparatus, decides an auxiliary consensus decided value, and a step in which the auxiliary consensus decided value takes precedence over the decided value of the distributed consensus algorithm under conditions under which the auxiliary consensus decided value decided by the auxiliary consensus device 20 and the decided value decided by the distributed consensus algorithm can conflict with each other.

Such an operation makes it possible to improve fault tolerance of the distributed system at low cost.

The auxiliary consensus device 20 decides and returns the auxiliary consensus decided value for an auxiliary consensus request received before deciding the auxiliary consensus decided value, and also returns the auxiliary consensus decided value when an auxiliary consensus request is received from another apparatus after deciding the auxiliary consensus decided value.

Furthermore, when the distributed consensus algorithm attempts to put new data to the Acceptor, if the Acceptor has already received the auxiliary consensus confirmation request, putting of the new data is rejected.

For this reason, it is possible to improve fault tolerance in the distributed system using the Paxos algorithm at low cost.

Furthermore, when different roles according to the distributed consensus algorithm are placed on an identical computer apparatus, a configuration may also be adopted in which data is delivered between the different roles on a memory instead of communication.

Adopting such a configuration reduces communication among different roles, and can realize high-speed processing.

A configuration may be adopted in which each of the plurality of server apparatuses includes a first decision node that receives/transmits data from/to the client apparatus and a second decision node that performs aggregation of the data and the consensus processing, the client apparatus puts data to all the first decision nodes, each first decision node transmits data to all the second decision nodes, the second decision node aggregates data received from the first decision node, executes the consensus processing, and when no data can be obtained from the first decision node, and/or a conflict occurs due to data inconsistency, the auxiliary consensus decided value is used.

Moreover, if there is no reply from the first decision node within a predetermined time, the second decision node may decide that no data can be obtained from the first decision node, save information indicating that no data has been obtained from the first decision node, decide a proposal value using data obtained from another first decision node, transmit the proposal value to the auxiliary consensus device, the auxiliary consensus device may decide the auxiliary consensus decided value from the proposal value and transmit the auxiliary consensus decided value to all the second decision nodes.

Thus, the distributed system using the first decision node and the second decision node can also improve fault tolerance at low cost.

Note that the present invention is not limited to the aforementioned embodiments, but includes various modifications. For example, the aforementioned embodiments have been described in detail in order to describe the present invention in an easy-to-understand way, and are not necessarily limited to ones provided with all the described components. Not only deletion but also replacement or addition of such components is possible.

REFERENCE SIGNS LIST

10: client apparatus, 20: auxiliary consensus device, 30: Proposer server apparatus, 40: Acceptor server apparatus, 50: Learner server apparatus, 60: server apparatus for decision node 1, 70: server apparatus for decision node 2

What is claimed is:

1. A distributed consensus method for performing data consensus processing in a distributed system that couples one or more client apparatuses and a plurality of server apparatuses via a network, the method comprising:
   a step in which each server apparatus performs data operation according to a predetermined distributed consensus algorithm;
   a step in which an auxiliary consensus device, which is an auxiliary device that assists in reaching consensus in an event of a failure in response to a request from each server apparatus, decides an auxiliary consensus decided value; and
   a step in which the auxiliary consensus decided value takes precedence over the decided value of the distributed consensus algorithm under conditions under which the auxiliary consensus decided value decided by the auxiliary consensus device and the decided value decided by the distributed consensus algorithm can conflict with each other,
   wherein the auxiliary consensus device decides whether or not a request with an identical identification number with the auxiliary consensus decided value has already been received from one of the server apparatuses,
   wherein, if the request with the identical identification number with the auxiliary consensus decided value has already been received from the one of the server apparatuses, then the auxiliary consensus device transmits to a source apparatus of the server apparatuses, the auxiliary consensus decided value with the identification number identical to that of the received auxiliary consensus request,
   wherein, if the request with the identical identification number with the auxiliary consensus decided value has not already been received from the one of the server apparatuses, then the auxiliary consensus device considers data included in the received auxiliary consensus request to be the auxiliary consensus decided value for the identification number, saves the data, and transmits the data to all the server apparatuses,
   wherein, each of the plurality of server apparatuses comprises a first decision node that receives/transmits the data from/to the client apparatus and a second decision node that performs aggregation of the data and the consensus processing,
      wherein, the client apparatus puts data to all the first decision nodes,
      wherein, each first decision node transmits data to all the second decision nodes,
      wherein, the second decision node aggregates data received from the first decision node, executes the consensus processing,
      wherein, the second decision node decides whether or not the data in a decision matrix is all the data and is the same as a priority value set in advance,
   wherein, if the data in the decision matrix is not all the data and is not the same as the priority value, then second decision node transmits the auxiliary consensus request to the auxiliary consensus device,
   wherein, the second decision node receives the auxiliary consensus decided value from the auxiliary consensus device, the second decision node stores the auxiliary consensus decided value as a confirmed value,
   wherein, if the data in the decision matrix is all the data and is the same as the priority value, then second decision node determines that consensus is achieved without transmitting the auxiliary consensus request to the auxiliary consensus device, stores the data from the decision matrix as the confirmed value, and completes a consensus with the identification number.

2. The distributed consensus method according to claim 1, wherein when the distributed consensus algorithm attempts to put new data to an Acceptor, if the Acceptor has already received an auxiliary consensus confirmation request, putting of the new data is rejected.

3. The distributed consensus method according to claim 1, wherein when different roles according to the distributed consensus algorithm are placed on an identical computer apparatus, data is delivered between the different roles on a memory instead of communication.

4. The distributed consensus method according claim 1, wherein
   wherein when no data can be obtained from the first decision node, and/or a conflict occurs due to data inconsistency, the auxiliary consensus decided value is used.

5. The distributed consensus method according to claim 4, wherein if there is no reply from the first decision node within a predetermined time, the second decision node decides that no data can be obtained from the first decision node, saves information indicating that no data has been obtained from the first decision node, decides a proposal value using data obtained from another first decision node, transmits the proposal value to the auxiliary consensus device, and
   the auxiliary consensus device decides the auxiliary consensus decided value from the proposal value and transmits the auxiliary consensus decided value to all the second decision nodes.

6. A distributed system comprising:
a plurality of server apparatuses coupled to one or more client apparatuses via a network; and
an auxiliary consensus device, which is an auxiliary device that assists in reaching consensus in an event of a failure in response to a request from the server apparatus, wherein
the plurality of server apparatuses perform data consensus processing by operating data according to a predetermined distributed consensus algorithm, and
auxiliary consensus decided value is caused to take precedence over a decided value of the distributed consensus algorithm under conditions under which an auxiliary consensus decided value decided by the auxiliary consensus device and the decided value decided by the distributed consensus algorithm can conflict with each other,
wherein the auxiliary consensus device decides whether or not a request with an identical identification number with the auxiliary consensus decided value has already been received from one of the server apparatuses,
wherein, if the request with the identical identification number with the auxiliary consensus decided value has already been received from the one of the server apparatuses, then the auxiliary consensus device transmits to a source apparatus of the server apparatuses, the auxiliary consensus decided value with the identification number identical to that of the received auxiliary consensus request,
wherein, if the request with the identical identification number with the auxiliary consensus decided value has not already been received from the one of the server apparatuses, then the auxiliary consensus device considers data included in the received auxiliary consensus request to be the auxiliary consensus decided value for the identification number, saves the data, and transmits the data to all the server apparatuses,
wherein, each of the plurality of server apparatuses comprises a first decision node that receives/transmits the data from/to the client apparatus and a second decision node that performs aggregation of the data and the consensus processing,
wherein, the client apparatus puts data to all the first decision nodes,
wherein, each first decision node transmits data to all the second decision nodes,
wherein, the second decision node aggregates data received from the first decision node, executes the consensus processing,
wherein, the second decision node decides whether or not the data in a decision matrix is all the data and is the same as a priority value set in advance,
wherein, if the data in the decision matrix is not all the data and is not the same as the priority value, then second decision node transmits the auxiliary consensus request to the auxiliary consensus device,
wherein, the second decision node receives the auxiliary consensus decided value from the auxiliary consensus device, the second decision node stores the auxiliary consensus decided value as a confirmed value, and
wherein, if the data in the decision matrix is all the data and is the same as the priority value, then second decision node determines that consensus is achieved without transmitting the auxiliary consensus request to the auxiliary consensus device, stores the data from the decision matrix as the confirmed value, and completes a consensus with the identification number.

7. A non-transitory machine readable storage medium encoded with medium-readable instructions for a distributed consensus program that performs data consensus processing on a distributed system that couples one or more client apparatuses and a plurality of server apparatuses via a network, the program causing each server apparatus to execute:
a step of performing data operation according to a predetermined distributed consensus algorithm;
a step of sending a request to an auxiliary consensus device, which is an auxiliary device that assists in reaching consensus in an event of a failure and deciding an auxiliary consensus decided value; and
a step of causing the auxiliary consensus decided value to take precedence over the decided value of the distributed consensus algorithm under conditions under which the auxiliary consensus decided value decided by the auxiliary consensus device and the decided value decided according to the distributed consensus algorithm can conflict with each other,
wherein the auxiliary consensus device decides whether or not a request with an identical identification number with the auxiliary consensus decided value has already been received from one of the server apparatuses,
wherein, if the request with the identical identification number with the auxiliary consensus decided value has already been received from the one of the server apparatuses, then the auxiliary consensus device transmits to a source apparatus of the server apparatuses, the auxiliary consensus decided value with the identification number identical to that of the received auxiliary consensus request,
wherein, if the request with the identical identification number with the auxiliary consensus decided value has not already been received from the one of the server apparatuses, then the auxiliary consensus device considers data included in the received auxiliary consensus request to be the auxiliary consensus decided value for the identification number, saves the data, and transmits the data to all the server apparatuses,
wherein, each of the plurality of server apparatuses comprises a first decision node that receives/transmits the data from/to the client apparatus and a second decision node that performs aggregation of the data and the consensus processing,
wherein, the client apparatus puts data to all the first decision nodes,
wherein, each first decision node transmits data to all the second decision nodes,
wherein, the second decision node aggregates data received from the first decision node, executes the consensus processing,
wherein, the second decision node decides whether or not the data in a decision matrix is all the data and is the same as a priority value set in advance,
wherein, if the data in the decision matrix is not all the data and is not the same as the priority value, then second decision node transmits the auxiliary consensus request to the auxiliary consensus device,
wherein, the second decision node receives the auxiliary consensus decided value from the auxiliary consensus device, the second decision node stores the auxiliary consensus decided value as a confirmed value, and
wherein, if the data in the decision matrix is all the data and is the same as the priority value, then second decision node determines that consensus is achieved without transmitting the auxiliary consensus request to the auxiliary consensus device, stores the data from the decision matrix as the confirmed value, and completes a consensus with the identification number.

* * * * *